US008331115B2

(12) United States Patent
Fenton et al.

(10) Patent No.: US 8,331,115 B2
(45) Date of Patent: *Dec. 11, 2012

(54) POWER SWITCHING SYSTEM TO INCREASE INDUCTION HEATING TO A LOAD FROM AVAILABLE AC MAINS POWER

(75) Inventors: David L. Fenton, Livonia, NY (US); Ian A. Paull, Henrietta, NY (US); Leslie L. Thompson, Honeoye Falls, NY (US); Kenneth J. Westveer, Rochester, NY (US)

(73) Assignee: Ameritherm, Inc., Scottsville, NY (US)

( * ) Notice: Subject to any disclaimer, the term of this patent is extended or adjusted under 35 U.S.C. 154(b) by 99 days.

This patent is subject to a terminal disclaimer.

(21) Appl. No.: 12/845,985

(22) Filed: Jul. 29, 2010

(65) Prior Publication Data

US 2010/0296322 A1 Nov. 25, 2010

Related U.S. Application Data

(63) Continuation of application No. 12/272,323, filed on Nov. 17, 2008, now Pat. No. 7,787,268.

(60) Provisional application No. 60/988,312, filed on Nov. 15, 2007.

(51) Int. Cl.
*H02M 1/12* (2006.01)

(52) U.S. Cl. ............................................ 363/47; 363/89

(58) Field of Classification Search .................... 363/47, 363/89, 44, 45
See application file for complete search history.

(56) References Cited

U.S. PATENT DOCUMENTS 6,111,770 A 8/2000 Peng
6,768,656 B2 * 7/2004 Figueroa .................... 363/21.03

* cited by examiner

*Primary Examiner* — Shawn Riley
(74) *Attorney, Agent, or Firm* — Rothwell, Figg, Ernst & Manbeck, P.C.

(57) ABSTRACT

In one aspect, the invention provides a power system for providing power to a load. In some embodiment, the system comprises: a rectifier configured to rectify an AC main signal to produce a rectified AC main signal; a zero cross detector configured to receive the AC main signal and to detect when the AC main signal equals zero; a switching device having (i) a first terminal connected to a first node, wherein a first output terminal of the rectifier is also connected to the first node and (ii) a second terminal connected to a second node; a tank circuit having (i) a first terminal coupled to a third node, wherein a second output terminal of the rectifier is also coupled to the third node and (ii) a second terminal coupled to the second node; a current and/or voltage detector connected to the second node; and a controller in communication with the current detector and zero cross detector and configured to turn on and off the switching device based on, at least in part, information received from the zero cross detector and the current and/or voltage detector.

9 Claims, 5 Drawing Sheets

POWER SWITCHING SYSTEM TO INCREASE INDUCTION HEATING TO A LOAD FROM AVAILABLE AC MAINS POWER

The present application is a Continuation of application Ser. No. 12/272,323, filed Nov. 17, 2008, which claims the benefit of U.S. Provisional patent application No. 60/988,312, filed on Nov. 15, 2007, the entire contents of which are incorporated herein by reference.

TECHNICAL FIELD

The present invention relates to systems and method for providing power to a load.

BACKGROUND

Induction heating systems may be required to run from a source of AC mains voltage that is limited by a circuit breaker and yet must deliver the most heating practical to a load. Such systems need high power factor and high efficiency. Further, if volume manufacturing is intended, such systems must be relatively tolerant of changes to the resonant circuit and loading that may occur due to unit-to-unit variations and environmental variations such as in temperature. Further, such systems must be adaptive to changing line voltage and power line “sag” when the application requires a tightly controlled average power or total energy to the load. Additionally, the electromagnetic interference generated by such systems must typically be limited to meet regulatory requirements. Protection for the switching device(s) is generally desired to make the system robust. The technique may also be used to drive an output rectifier and filter for DC load applications as a switching supply.

SUMMARY

In one aspect, the present invention provides a system for providing power to a load that accomplishes at least some of the objectives discussed above with little circuitry and inexpensive components. In one embodiment, the power system uses only a single power switching device. In some embodiment, the system comprises: a rectifier configured to rectify an AC main signal to produce a rectified AC main signal; a zero cross detector configured to receive the AC main signal and to detect when the AC main signal equals zero; a switching device having (i) a first terminal connected to a first node, wherein a first output terminal of the rectifier is also connected to the first node and (ii) a second terminal connected to a second node; a tank circuit having (i) a first terminal coupled to a third node, wherein a second output terminal of the rectifier is also coupled to the third node and (ii) a second terminal coupled to the second node; a current and/or voltage detector connected to the second node; and a controller in communication with the current detector and zero cross detector and configured to turn on and off the switching device based on, at least in part, information received from the zero cross detector and the current and/or voltage detector.

In some embodiments, the controller is configured to turn off the switching device only when the AC main voltage is at or about zero volts. In some embodiment, the controller is further configured to turn the switching device off only when (i) a delivered amount of power is less than a threshold amount of power or (ii) the voltage across the switching device or the current flow through the switching device is greater than a threshold.

In some embodiments, the controller is configured to turn on the switching device only when (i) a delivered amount of power is less than a threshold amount of power and (ii) the voltage across the switching device or the current flow through the switching device is at about zero.

In another aspect, the present invention provides a method for operating the power system. In some embodiments, the method integrates the function of a relaxation oscillator to trigger radio frequency (RF) pulses that are sparse at low line voltages, and may be continuous at high line voltages. In some embodiments, the relaxation oscillator triggers based on a current threshold having been reached in the switching device. Thus, in these embodiments, there is inherent protection of the switching device against over-current. In some embodiments, the relaxation oscillator responds quickly to follow a rectified alternating-current (AC) mains voltages, That is, the sparse-to-dense variation of RF pulses can keep up with the nearly unfiltered output of a full wave bridge rectifier as the half sine wave voltage swings from zero to maximum and back. The variation in the time between pulses has an advantage of spreading some of the spectral components of incidentally generated interference. Since there is very little capacitance at the rectifier output, and since RF may be generated even near the AC mains zero crossings, power factor as seen on the AC mains is high.

The above and other aspects and embodiments of the invention are discussed below.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

FIG. 4 is a plot showing switching device drain-source voltage vs time magnified over an interval where the switching device is mostly on.

DETAILED DESCRIPTION

Figure 1:
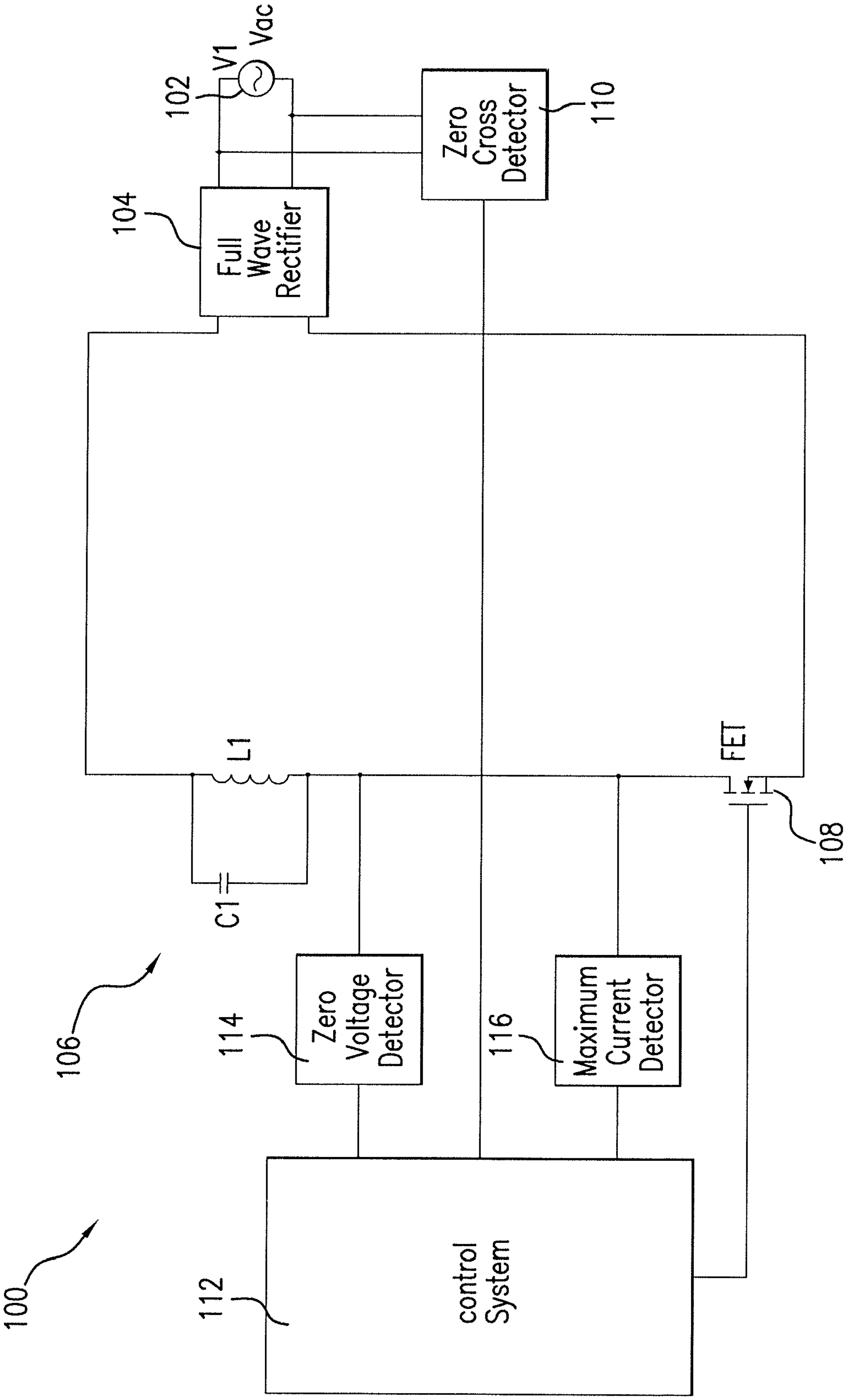
FIG. 1 is functional block diagram illustrating an apparatus according to some embodiments of the invention.

Referring now to FIG. 1, FIG. 1 is functional block diagram illustrating a system 100 according to some embodiments of the invention.

As shown in FIG. 1, power from the AC mains 102 enters system 100 as V1, and is received by a full wave bridge rectifier 104, which rectifies the received AC signal. Thus, for example, system 100 includes an AC main power socket plug (not shown) that delivers AC mains power to rectifier 104. The resulting rectified AC signal is fed with little filtering (not shown) across a tank circuit 106 composed of an inductance L1 (e.g., the work coil for induction heating systems) and a capacitance C1, and a switching device 108 (which may be, for example, a field effect transistor (FET)) connected between an output terminal of rectifier 104 and a terminal of tank circuit 106. The AC mains signal is also fed into a zero crossing detector 110, which signals AC mains zero crossing events to a control system 112. There is a zero voltage detector 114 which monitors the voltage across device 108 (e.g., in case device 108 is a FET, detector 114 monitors the FET's drain-source voltage) signaling control system 112 when this is sufficiently close to 0 volts over the interval when the switching device 108 is off. There is also a maximum current detector 116 that monitors a current flowing through switching device 108 (e.g., in case device 108 is a FET, detector 116 monitors the FET's drain-source voltage when the FET is on, as an indication of current through the FET). Detector 116 signals control system 112 when a desired maximum current through device 108 has been reached or exceeded.

In some embodiments, system 100 may operate as follows. Control system 112 turn on switching device 108 when there is little voltage across device 108 For example, switching device 108 may be turned on when the rectified AC equals or is close to 0 volts. At this point, switching device 108 may be turned on without a large current surge as there is little voltage across it.

While device 108 is turned on, current builds up through the output coil L1 until an allowed maximum is reached, then switching device 108 is turned off. This maximum may either be a preset fixed level or proportional to the instantaneous AC mains voltage. In some embodiments, switching device 108 is a high speed FET to minimize losses for this event, although the voltage across device 108 is minimal at this time so loss is reduced. Although a FET is frequently mentioned in this description, other switching devices may be used as well. For the sake of brevity, we shall assume that device 108 is a FET.

The on resistance of FET 108 may optionally be used to monitor the current through the FET by measuring the drain to source voltage in this interval when the FET is on. When FET 108 is switched off, the energy stored in inductor L1 transfers into the resonating capacitor C1 across it (except for losses and power delivered to a load (not shown)). The energy will transfer again to the inductor L1 from the capacitor C1, at which point there will be a moment of zero voltage across FET 108. At this point, FET 108 may again be switched on, and the inductor L1 current will build up for the next cycle. Because system 100 does not have a controlled RF frequency source, but only passive ringing of the tank circuit, the capacitor and inductor of the tank circuit 106 do not need a tightly controlled resonant frequency and tightly controlled inductance and capacitance values. In the embodiment, shown, the circulating current between the inductor L1 and capacitor C1 does not pass though any active components, improving efficiency. Thus, in some embodiments, there are no critical value matching components with corresponding unit-to-unit or temperature variation problems.

The amount of power or energy provided to tank circuit 106 may be achieved by cycle skipping at the AC mains cycle rate. That is, at the appropriate zero crossing of the AC mains, switching device 108 may be enabled or disabled for the duration of that cycle. RF power may be held off (i.e., device 108 off) beginning at the next AC mains zero crossing, or enabled for the next AC mains cycle depending on system response goals. Additionally, power may also be reduced by leaving the device 108 off and not beginning another RF cycle at some point prior to the next AC mains zero crossing.

In some embodiments, control system 112, which may include a small power supply and other components (e.g., microprocessor or other controller) is configured (e.g. programmed via software) to regulate the power provided to tank circuit. For example, in some embodiments, control system 112 is configured to turn on/off FET 108 at every integral cycle zero crossing of the AC mains according to the following rule: (1) turn off FET 108 if (a) the power delivered is greater than the average desired or (b) the output of maximum current detector 116 is "true"; and (2) turn on FET if (a) the RF delivered is less than the average desired and (b) the output of zero voltage detector 110 is "true."

Figure 2:
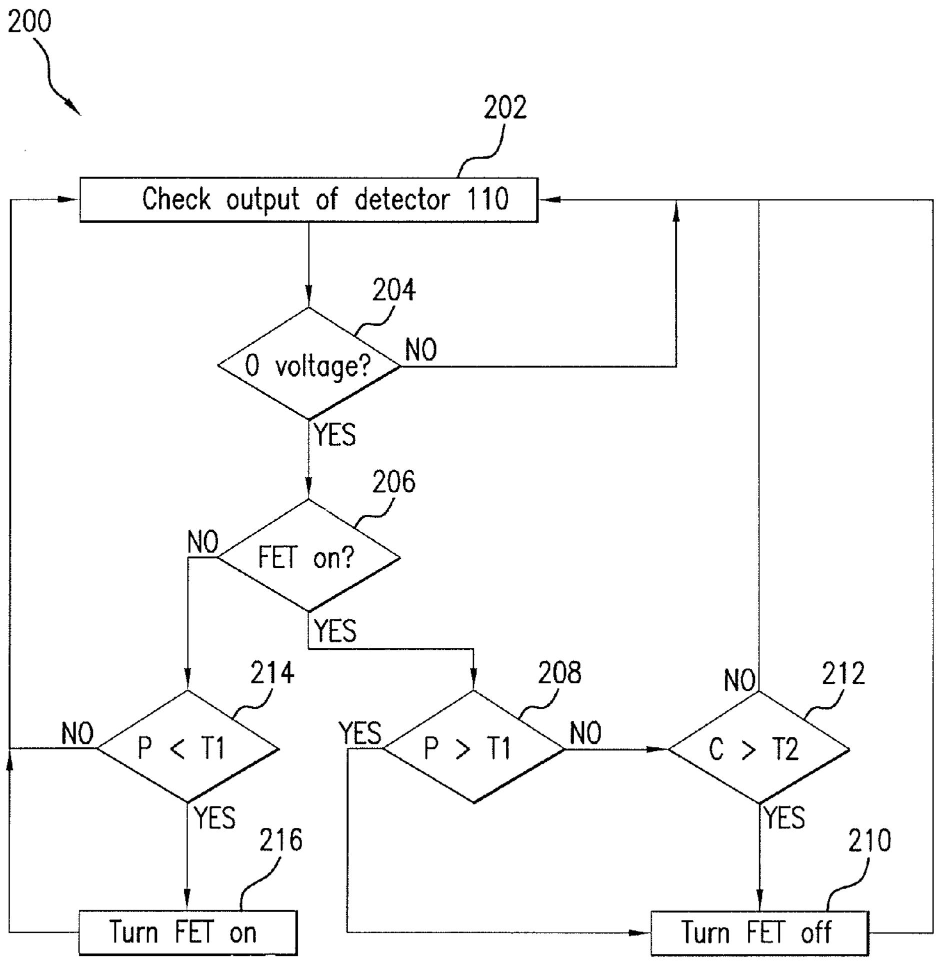
FIG. 2 is a flow chart illustrating a process according to some embodiments of the invention.

Accordingly, in some embodiments, controller 112 implements process 200 (see FIG. 2). Process 200 may begin in step 202, where controller 112 checks the output of detector 110. In step 204, controller 112 determines, based on the output of detector 112, whether the AC mains voltage is zero. If it is not, process 200 goes back to step 202, otherwise it proceeds to step 206. In step 206, controller 112 determines whether FET 108 is on or off. If FET 108 is on, process 200 proceeds to step 208, otherwise it proceeds to step 214. In step 208, controller 112 determines whether amount of power delivered to circuit 106 is greater than a desired amount of power. If it is, then controller 112 turns FET 108 off (step 210), otherwise the process proceeds to step 212. In step 212, controller 112 determines whether a current threshold has been reached (e.g., controller 112 checks the output of detector 116 to determine whether the output is set to "true"). If the current threshold has been reached, then the process proceeds to step 210, otherwise it proceeds to step 202. In step 214, controller 112 determines whether there is zero voltage across FET 108 (e.g., controller checks the output of detector 114 to see if the output is set to "true"). If there is a zero voltage across FET 108, controller 112 turn FET 108 on (step 216). After step 216, process 200 proceeds back to step 202.

In some embodiments, it is desired to maintain an average DC component of zero at the AC mains feed point, as upstream transformer saturation may otherwise occur. This implies either dropping of integral, complete AC mains cycles or otherwise tailoring when the RF is disabled to maintain this balance. As described above, RF cycles will cease near the AC mains zero crossing. An auxiliary circuit may optionally be used to cause repetitive firing of the FET 108 for a short time before and after the zero crossing.

Figure 3:
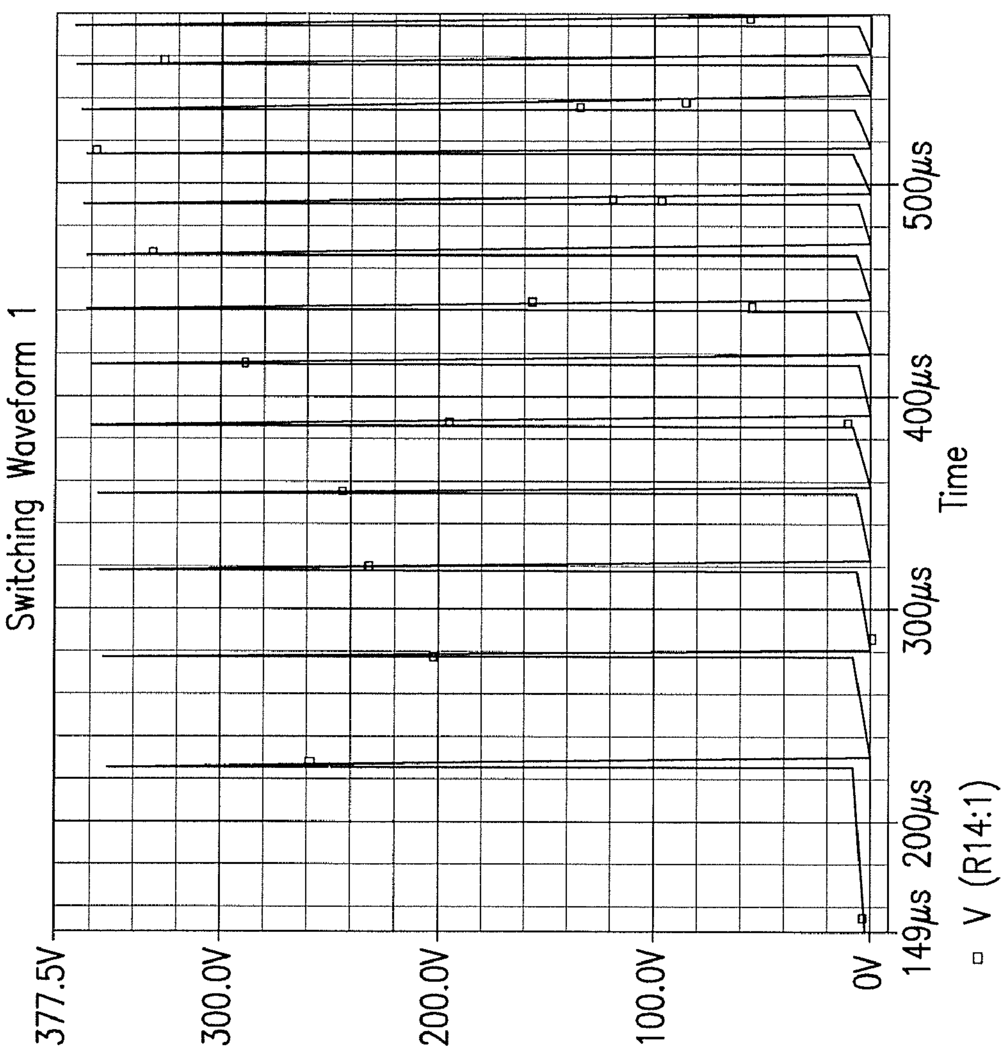
FIG. 3 is a plot showing switching device drain-source voltage vs time.

Referring now to FIG. 3, FIG. 3 shows the FET 108 drain-source Voltage vs Time after an AC mains zero crossing during which the RF is enabled, corresponding to an average RF level that had been running below that which was desired. The RF pulses shown on the left are farther apart than on the right. This is because the rectified AC mains voltage applied to the circuit is increasing during this interval, and the time it takes for the current through the FET to reach the switching point is longer at lower voltages.

Figure 4:
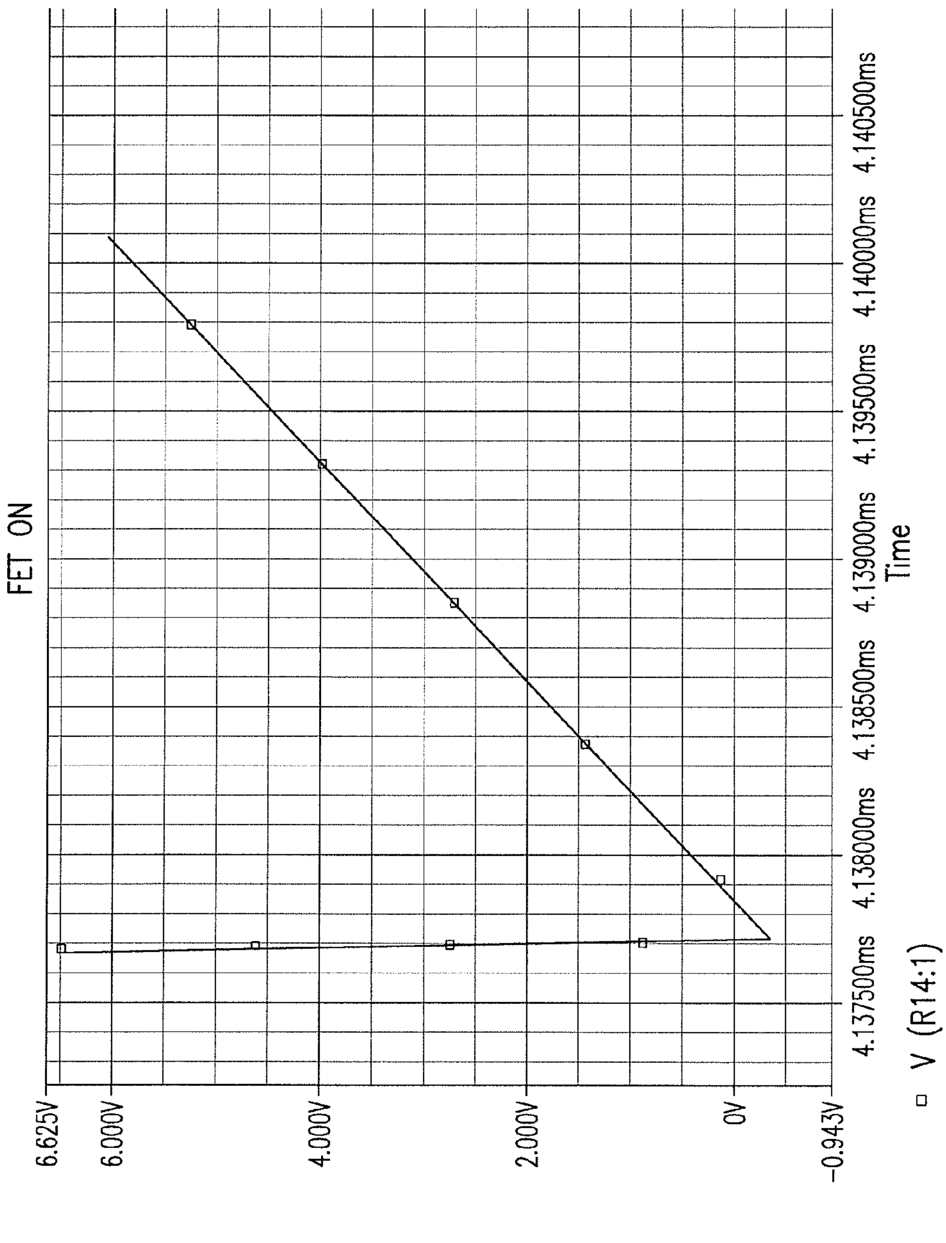

Referring now to FIG. 4, FIG. 4 shows FET 108 drain-source Voltage vs Time magnified over an interval where the FET is mostly on. The nearly linear ramp indicates an increasing drain-source voltage corresponding to the increasing current through the FET acting on a fairly constant FET on resistance.

Figure 5:
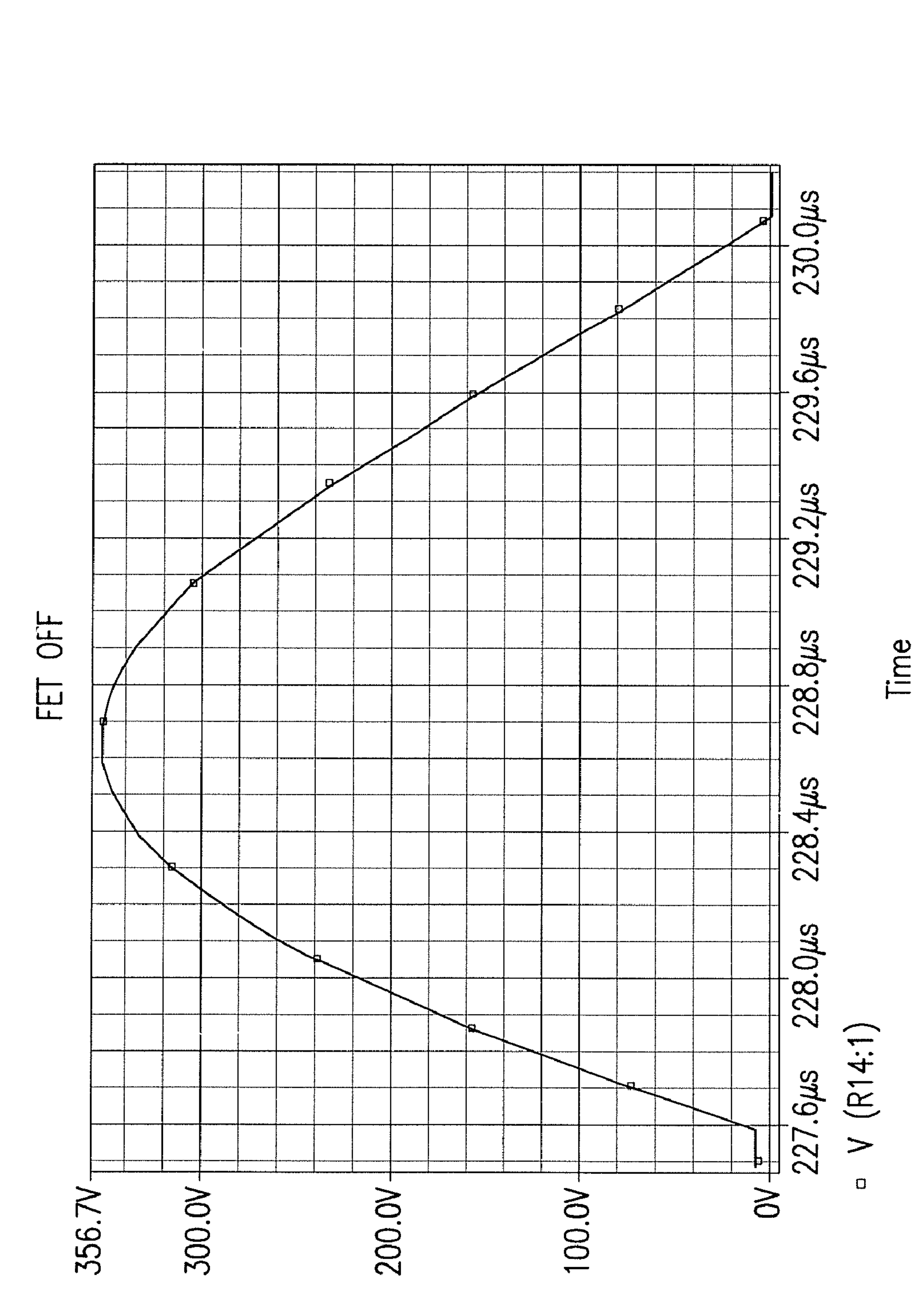
FIG. 5 is a plot showing switching device drain-source voltage vs time magnified over an interval where the switching device is mostly off.

Referring now to FIG. 5, FIG. 5 shows the FET 108 drain-source Voltage vs Time magnified over an interval where the FET is mostly off. The voltage swing up and the return to zero volts corresponds to a ringing between L1 and C1. The zero volt region on the right meets the condition for the FET to come on again, for the cycle to repeat.

While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A power system for providing power to a load, comprising:

a rectifier configured to rectify an AC signal to produce a rectified signal;

a zero cross detector configured to receive the AC signal and to detect when the AC signal equals zero;

a switching device having (i) a first terminal connected to a first node, wherein a first output terminal of the rectifier is also connected to the first node and (ii) a second terminal connected to a second node;

a tank circuit having (i) a first terminal connected to a third node, wherein a second output terminal of the rectifier is also connected to the third node and (ii) a second terminal connected to the second node;

a voltage detector operable to monitor the voltage across the switching device or a current detector operable to monitor the current flowing through the switching device; and a controller in communication with the current and/or voltage detector and in communication with the zero cross detector and configured to change the state of the switching device based on, at least in part, information received from the zero cross detector and the current and/or voltage detector.

2. The power system of claim 1, wherein the controller is configured to turn off the switching device only when the AC signal is at or about zero volts.

3. The power system of claim 1, wherein the controller is configured to turn on the switching device on only when (i) a delivered amount of power is less than a threshold amount of power and (ii) the voltage across the switching device or the current flow through the switching device is at about zero.

4. The power system of claim 1, wherein the second output terminal of the rectifier is connected directly to the third node.

5. The power system of claim 1, wherein the second output terminal of the rectifier is connected to the third node through a filter.

6. The power system of claim 1, wherein the switching device is a field effect transistor (FET).

7. The power system of claim 6, comprising the voltage detector, wherein the voltage detector is configured to monitor the FET's drain-source voltage.

8. The power system of claim 1, wherein the controller is configured to turn off the switching device whenever the following is true: (1) the zero cross detector indicates that the voltage of the AC signal is substantially zero, (2) the switching device is on, and (3) an amount of power delivered to the tank circuit is less than a desired amount of power or a detector indicates that the voltage across the switching device is substantially zero.

9. The power system of claim 1, wherein the controller is configured to turn on the switching device whenever the following is true: (1) the zero cross detector indicates that the voltage of the AC signal is substantially zero, (2) the switching device is off, and (3) an amount of power delivered to the tank circuit is greater than a desired amount of power or the voltage or current detector indicates that a current threshold has been reached.

* * * * *